US009418438B2

(12) United States Patent
Ratcliff et al.

(10) Patent No.: US 9,418,438 B2
(45) Date of Patent: Aug. 16, 2016

(54) NETWORKED CAPTURE AND 3D DISPLAY OF LOCALIZED, SEGMENTED IMAGES

(75) Inventors: Joshua Ratcliff, San Jose, CA (US); Yi Wu, San Jose, CA (US); Maha El Choubassi, Beirut (LB); Yoram Gat, Tel Aviv (IL); Wei Sun, San Jose, CA (US); Kalpana Seshadrinathan, San Jose, CA (US); Igor V. Kozintsev, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 204 days.

(21) Appl. No.: 13/977,339

(22) PCT Filed: Sep. 12, 2011

(86) PCT No.: PCT/US2011/051203
§ 371 (c)(1),
(2), (4) Date: May 12, 2014

(87) PCT Pub. No.: WO2013/039472
PCT Pub. Date: Mar. 21, 2013

(65) Prior Publication Data
US 2014/0233847 A1    Aug. 21, 2014

(51) Int. Cl.
*G06T 7/00* (2006.01)
*G06T 19/20* (2011.01)
(Continued)

(52) U.S. Cl.
CPC .......... *G06T 7/0081* (2013.01); *G06K 9/00228* (2013.01); *G06K 9/342* (2013.01); *G06T 7/0044* (2013.01); *G06T 7/0097* (2013.01); *G06T 19/20* (2013.01); *G06T 2207/20144* (2013.01);
(Continued)

(58) Field of Classification Search
None
See application file for complete search history.

(56) References Cited

U.S. PATENT DOCUMENTS

2006/0039690 A1  2/2006 Steinberg et al.
2007/0133880 A1  6/2007 Sun et al.
(Continued)

FOREIGN PATENT DOCUMENTS

CN    101162524 A    4/2008
CN    101416219 A    4/2009
(Continued)

OTHER PUBLICATIONS

Notice of Preliminary Rejection for Korean Patent Application No. 10-2014-7007671, mailed May 26, 2015, 4 pages.
Organized Translation of Notice of Reasons for Rejection for Japanese Patent Application No. 2014-529663, mailed Apr. 7, 2015, 2 pages.
(Continued)

*Primary Examiner* — Utpal Shah
*Assistant Examiner* — Kate R Duffy
(74) *Attorney, Agent, or Firm* — Lynch Law Patent Group, P.C.

(57) ABSTRACT

Systems, devices and methods are described including receiving a source image having a foreground portion and a background portion, where the background portion includes image content of a three-dimensional (3D) environment. A camera pose of the source image may be determined by comparing features of the source image to image features of target images of the 3D environment and using the camera pose to segment the foreground portion from the background portion may generate a segmented source image. The resulting segmented source image and the associated camera pose may be stored in a networked database. The camera pose and segmented source image may be used to provide a simulation of the foreground portion in a virtual 3D environment.

21 Claims, 9 Drawing Sheets

(51) Int. Cl.
*G06K 9/34* (2006.01)
*G06K 9/00* (2006.01)

(52) U.S. Cl.
CPC ............... G06T2207/30196 (2013.01); *G06T 2207/30244* (2013.01)

(56) References Cited

U.S. PATENT DOCUMENTS

| | | | | |
|---|---|---|---|---|
| 2008/0273751 | A1* | 11/2008 | Yuan | G06K 9/32 382/103 |
| 2009/0315978 | A1* | 12/2009 | Wurmlin | G06T 5/005 348/43 |
| 2011/0128354 | A1 | 6/2011 | Tien et al. | |

FOREIGN PATENT DOCUMENTS

| | | | |
|---|---|---|---|
| JP | 2004526266 | A | 8/2004 |
| JP | 2005339127 | A | 12/2005 |
| KR | 10-2003-0019559 | A | 3/2003 |
| WO | 2013/039472 | A1 | 3/2013 |

OTHER PUBLICATIONS

Kato et al., "An Augmented Reality System and its Calibration Based on Marker Tracking," Transactions of the Virtual Reality Society of Japan, The Virtual Reality Society of Japan, Dec. 31, 1999, vol. 4, No. 4, 13 pages.

International Preliminary Report on Patentability and Written Opinion received for PCT Patent Application No. PCT/US2011/051203, mailed on Mar. 20, 2014, 6 pages.

Lowe, David G., "Object Recognition from Local Scale-Invariant Features", Computer Vision, 1999. The Proceedings of the Seventh IEEE International Conference, vol. 2, 1999, pp. 1150-1157.

International Search Report and Written opinion for PCT Patent Application No. PCT/US2011/051203, mailed on May 1, 2012, 12 Pages.

Vincent, et al., "Detecting Planar Homographies in an Image Pair", Image and Signal Processing and Analysis, 2001. ISPA 2001. Proceedings of the 2nd International Symposium, 2001, 6 Pages.

Search Report for Chinese Patent Application No. 10-2014-7007671, mailed May 26, 2015, 4 pages.

* cited by examiner

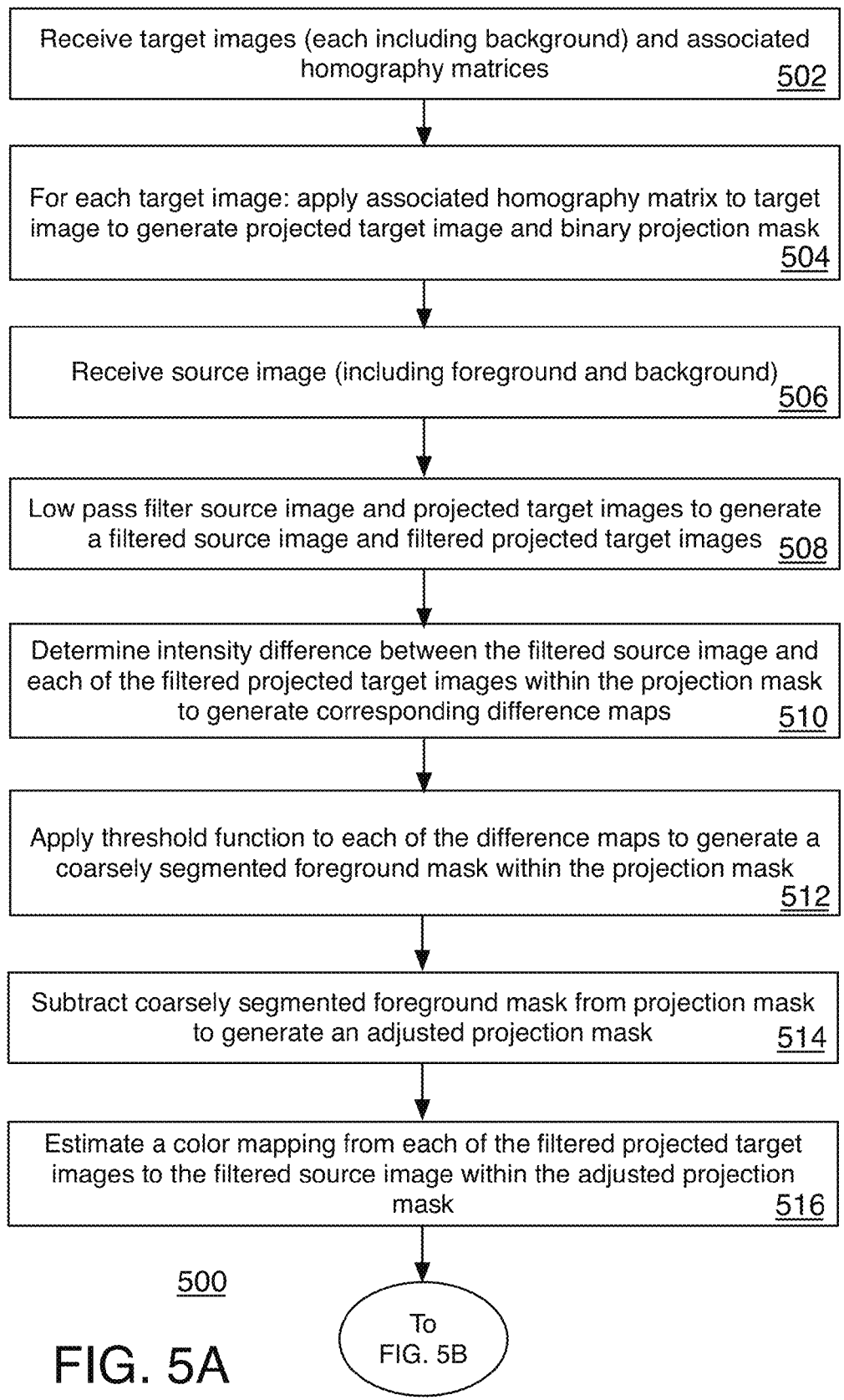

NETWORKED CAPTURE AND 3D DISPLAY OF LOCALIZED, SEGMENTED IMAGES

BACKGROUND

Current automated methods for viewing group images do not take into account the combined effect of per-camera image localization and foreground segmentation. Instead, the images are shown one-at-a-time, typically in slideshows. At present, to achieve this effect, images are processed offline by hand.

Typically, the indoor localization of mobile devices relies on some form of local infrastructure setup such as Global Positioning System (GPS) tower locations, wireless tower locations, multiple access point locations, and so forth. These infrastructure elements can be very expensive to implement and sometimes even impossible to provide for many indoor environments, such as theme parks, museums, convention centers, homes, and the like.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 5A, 5B and 5C depict a flow chart illustrating an example image segmentation process;

DETAILED DESCRIPTION

Figure 1:
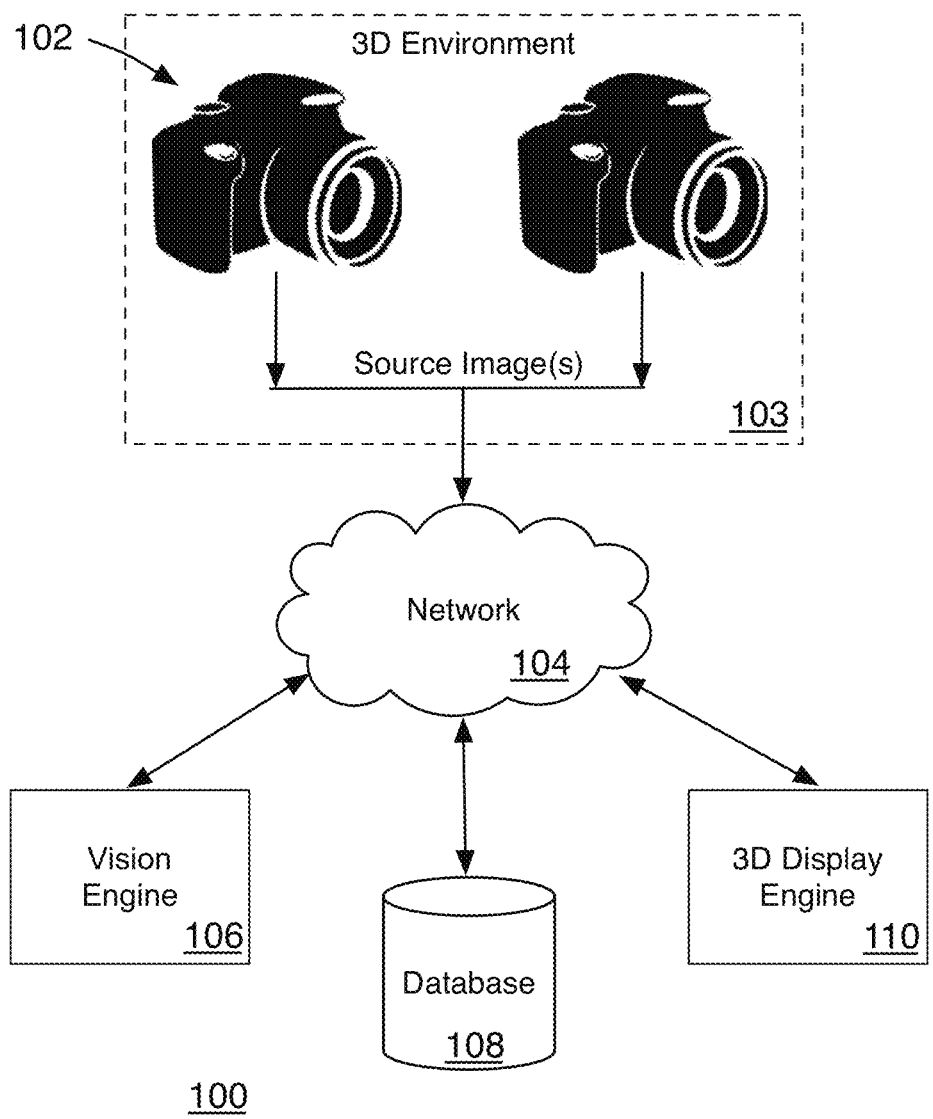
FIG. 1 is an illustrative diagram of an example system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

FIG. 1 illustrates an example system 100 in accordance with the present disclosure. In various implementations, system 100 may include one or more cameras 102 providing one or more two-dimensional (2D) source images to a wireless and/or wired network 104 (such as, e.g., the internee) where the source images have been captured in a three-dimensional (3D) environment 103. In various implementations, cameras 102 may be any type of camera capable of providing 2D source images in digital form to network 104. The source images may have any resolution and/or aspect ratio.

The source images may be provided via network 104 to a vision engine 106 where the source images may be subjected to camera localization and image segmentation processes to be described herein. Vision engine 106 may provide results of the camera localization and image segmentation processes to a networked database 108 and a 3D display engine 110 may access those results from database 108 for the purposes of providing a 3D environment simulation to also be described herein. In various implementations, vision engine 106 may provide results of camera localization and image segmentation processes to display engine 110 without first storing those results in database 108. Further, in various implementations, vision engine 106 may be adjacent to display engine 110 and may provide results of camera localization and image segmentation processes directly to display engine 110 without using network 104 to do so.

Figure 2:
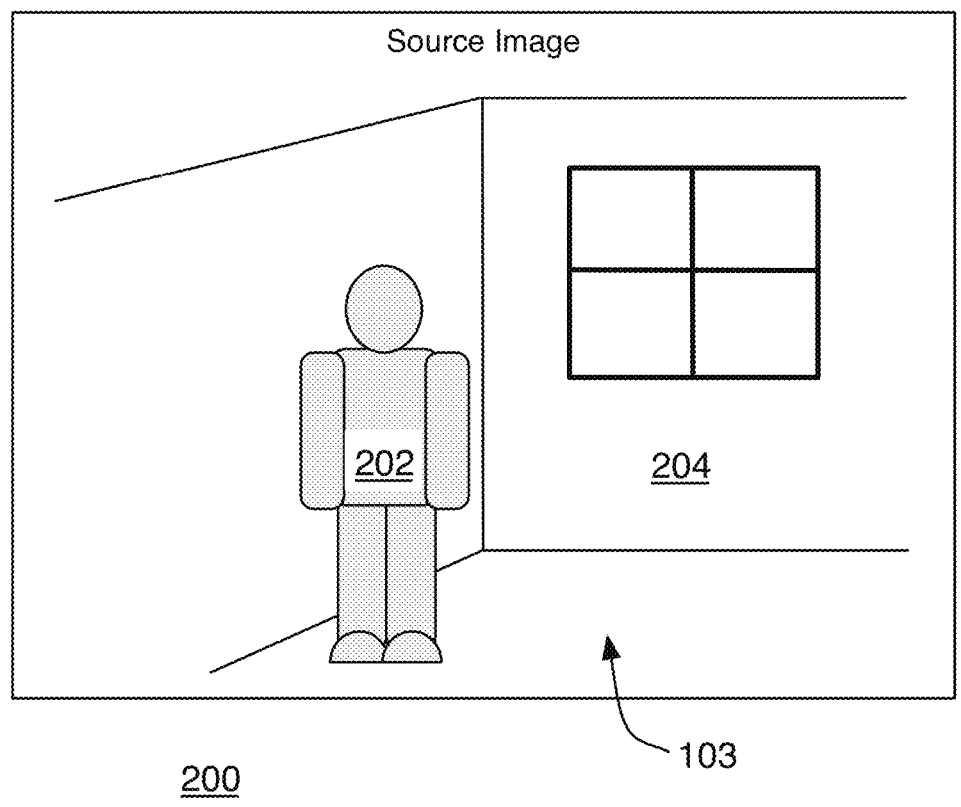
FIG. 2 illustrates an example source image.

In various implementations, source images captured in 3D environment 103 by cameras 102 may include a background portion and a foreground portion. For instance, FIG. 2 illustrates an example 2D source image 200 captured in 3D environment 103. Image 200 includes a foreground portion 202 (e.g., a human subject) and a background portion 204 (e.g., portions of a room such as floors, walls, windows and the like).

Figure 3:
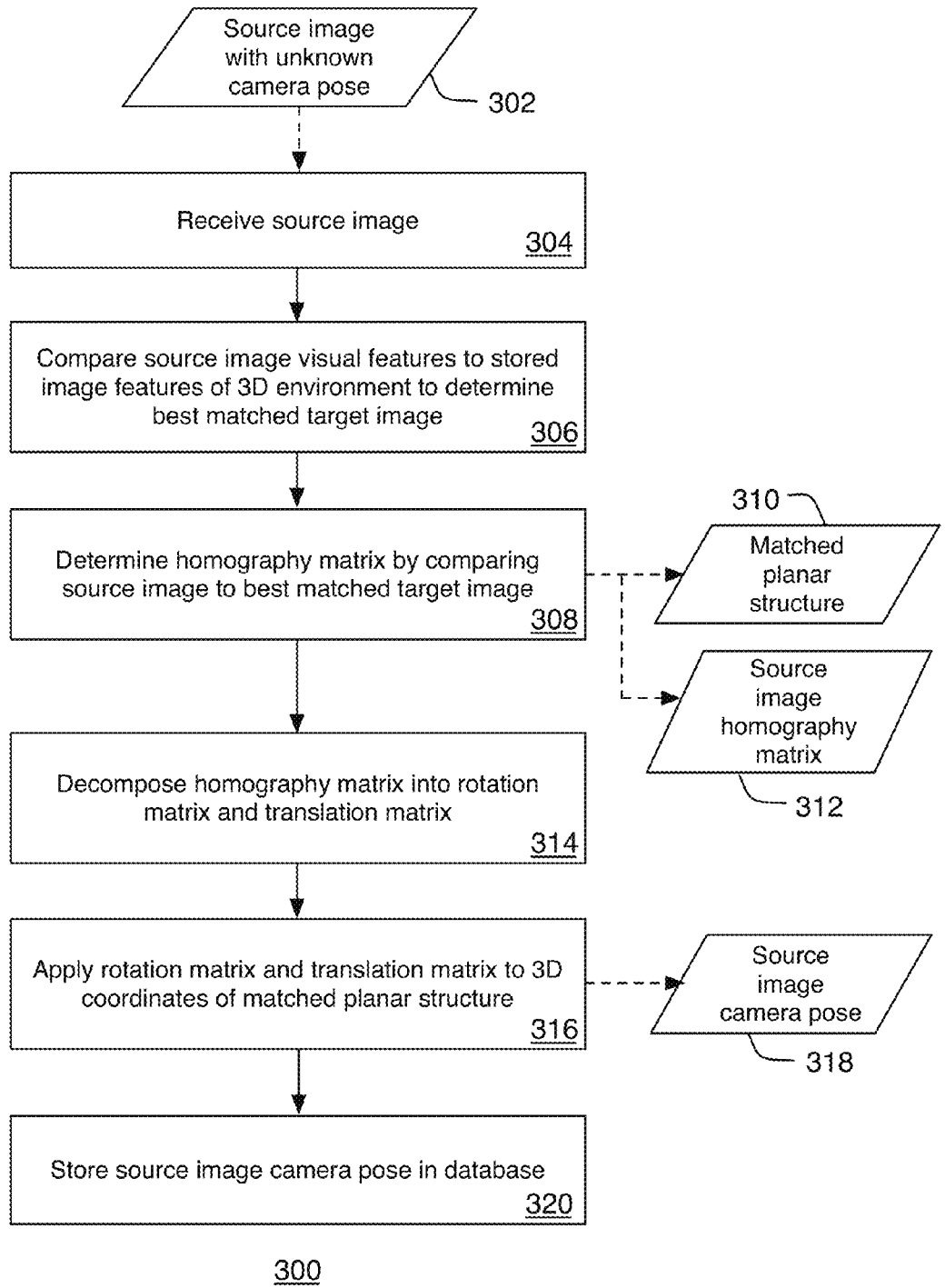
FIG. 3 is a flow chart illustrating an example image localization process.

FIG. 3 illustrates a flow diagram of an example image localization process 300 according to various implementations of the present disclosure. Process 300 may include one or more operations, functions or actions as illustrated by one or more of blocks 304, 306, 308, 314, 316 and 320 of FIG. 3 and may result in the determination of a camera pose of a source image. By way of non-limiting example, process 300 will be described herein with reference to example system 100 of FIG. 1. In various implementations, process 300 may be undertaken by vision engine 106 of system 100. Process 300 may begin at block 304 where a source image 302 having an unknown camera pose may be received. For example, block 304 may involve vision engine 106 receiving source image 302 via network 104.

Figure 4:
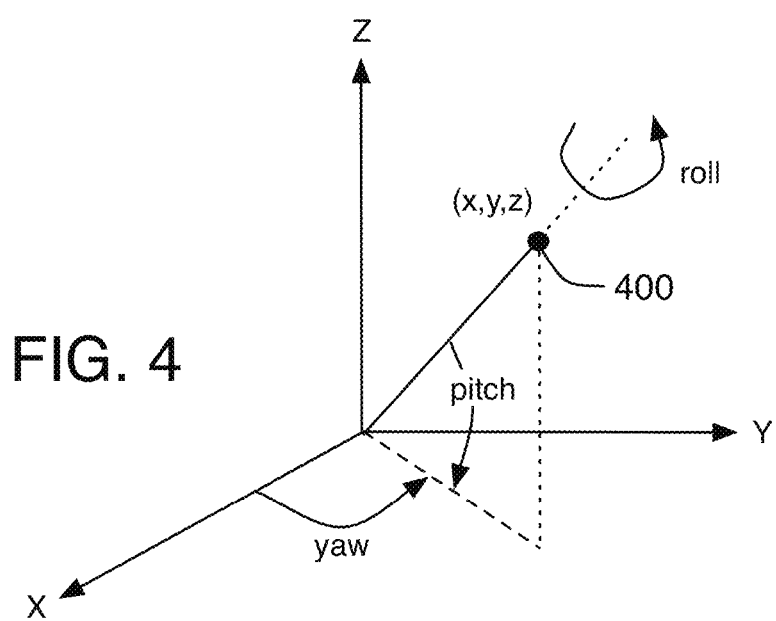
FIG. 4 illustrates camera pose coordinates.

In various implementations, block 304 may involve receiving a source image such as example image 200 that has been captured in a known 3D environment (e.g., environment 103). Although having been captured in a known 3D environment, the pose of the camera that captured the source image in that 3D environment is unknown. According to the well-known pinhole camera model, camera pose may be expressed as a six-dimensional quantity including positional information such as the 3D positional coordinates (e.g., in Cartesian (x, y, z) coordinates) of the camera as well as attitudinal or orientation information including the yaw, pitch and roll (e.g., in angular values) of the camera with respect to the 3D environment. For example, FIG. 4 illustrates camera pose coordinates with respect to an example camera location 400 within the (X,Y,Z) coordinate system of 3D environment 103.

A 3D environment (e.g., environment 103) includes multiple 2D planar structures and their corresponding target images. Each target image represents an image of a planar structure in the 3D background environment and the image features of this target image may be extracted and stored in database 108. At block 306, source image visual features may be compared to stored image features of the 3D environment to determine a best-matched target image. For example, block 306 may involve extracting visual features from the source image using known computer vision techniques such as Scale-Invariant Feature Transform (SIFT) techniques (see, e.g., D. G. Lowe, "Object recognition front local scale-invariant features," Proc. of the International Conference on Computer Vision, Corfu (September 1999)). In various implementations, the visual features may include image textures. The visual features extracted from the source image may then be compared to visual features, such as image textures, previously extracted from target images of the 3D environment (e.g., corresponding to various portions of the background 204 of source image 200 as captured in the target images) and stored in, for example, database 108. The comparison of block 306 may result in the identification of a best-matched target image from among the stored target images of the 3D environment.

At block 308, a homography matrix H may be determined by comparing the source image to the best matched target image. In various implementations, the homography matrix H represents a non-singular 3×3 matrix that provides a projective transformation of the source image to a planar structure in the 3D environment associated with the best matched target image determined at block 306. Various known techniques may be employed to determine the homography matrix H at block 308 (see, e.g., E. Vincent and R. Laganiere, "Detecting planar homographies in an image pair," Proceedings of the 2nd International Symposium on Image and Signal Processing and Analysis (2001)) (hereinafter: "Vincent and Laganiere").

Because the source image may include multiple planes, block 308 may involve identifying a dominant plane in the source image that matches the planar structure in the 3D environment. In various implementations, block 308 may include identifying matching points between the planar structure and the source image. For example, four corresponding matched points may be sufficient to estimate the homography matrix H at block 308. Block 308 may result in the production of a matched planar structure 310 of the 3D environment and a source image homography matrix 312.

At block 314, for a planar structure, the homography matrix H describes the perspective projection relationship from a 3D point M to its corresponding 2D point m, which may be represented by m=HM, where H=K[R|T], where K is a 3×3 camera calibration matrix that depends of the internal parameters of a camera such as the focal length and so forth, and [R|T] is the 3×4 camera pose parameter (where R represents the 3\3 rotation matrix and T is a translation). Since H and K are known, the camera pose may be estimated by least-squares minimization techniques given a few (n>6) known mapping measurements of M and m. If the measurements $\{m_i\}$ are noisy, the camera pose may be refined by minimizing the sum of the reprojection errors, or the squared distance between the projection of the 3D points and their measured 2D coordinates. The minimization may then be solved using an iterative optimization scheme.

At block 316, the rotation matrix R and the translation matrix T may be applied to the 3D coordinates of the matched planar structure to generate the source image camera pose 318. Process 300 may then conclude at block 320 where the source image camera pose may be stored in a network accessible database such as database 108 of system 100 for later use as will be described in greater detail below. The source image camera pose may be stored in the database as metadata associated with a segmented source image as will be explained further below.

While implementation of example process 300, as illustrated in FIG. 3, may include the undertaking of all blocks shown in the order illustrated, the present disclosure is not limited in this regard and, in various examples, implementation of process 300 may include the undertaking only a subset of all blocks shown and/or in a different order than illustrated.

Figure 5B:
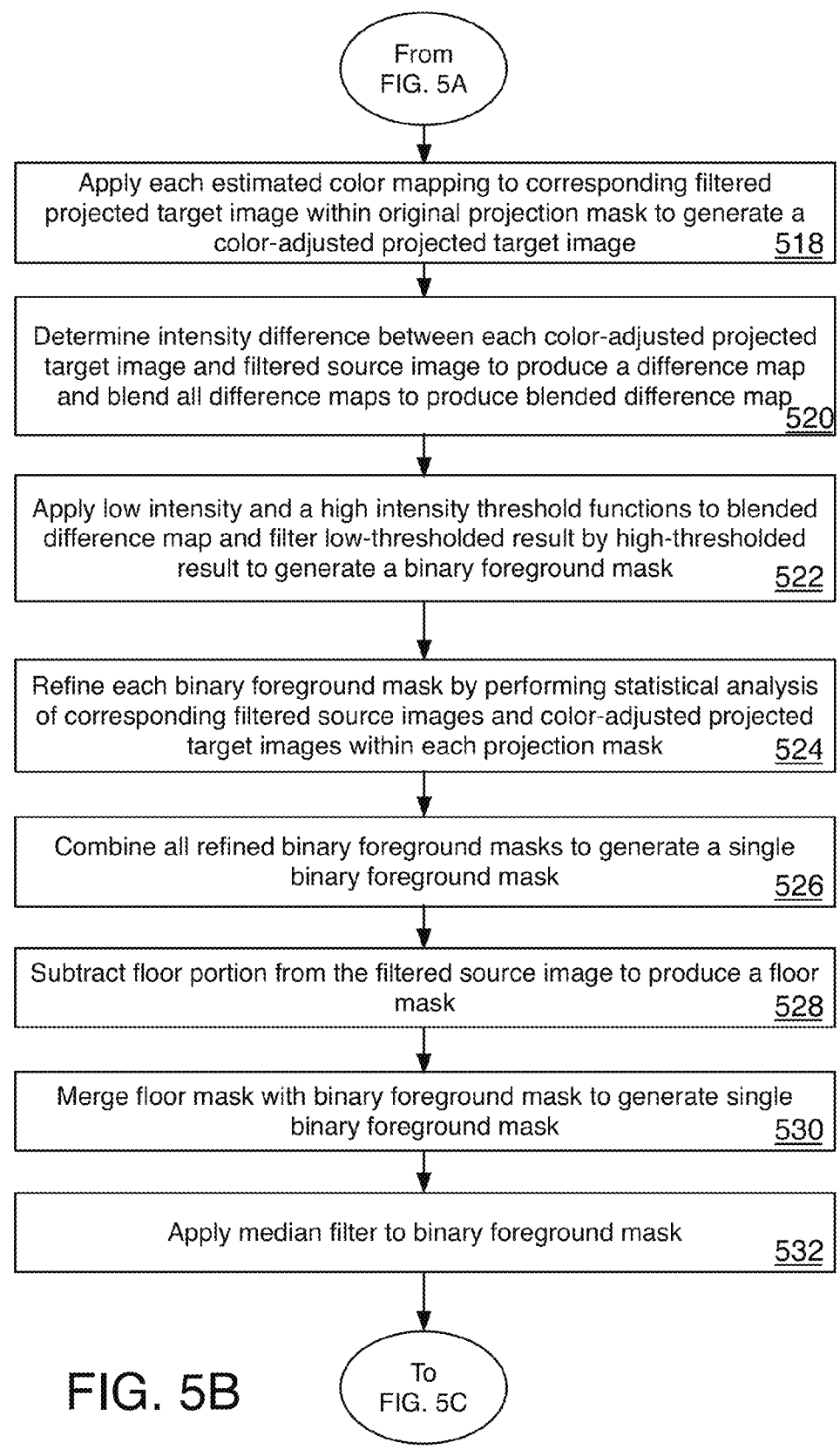
Figure 5C:
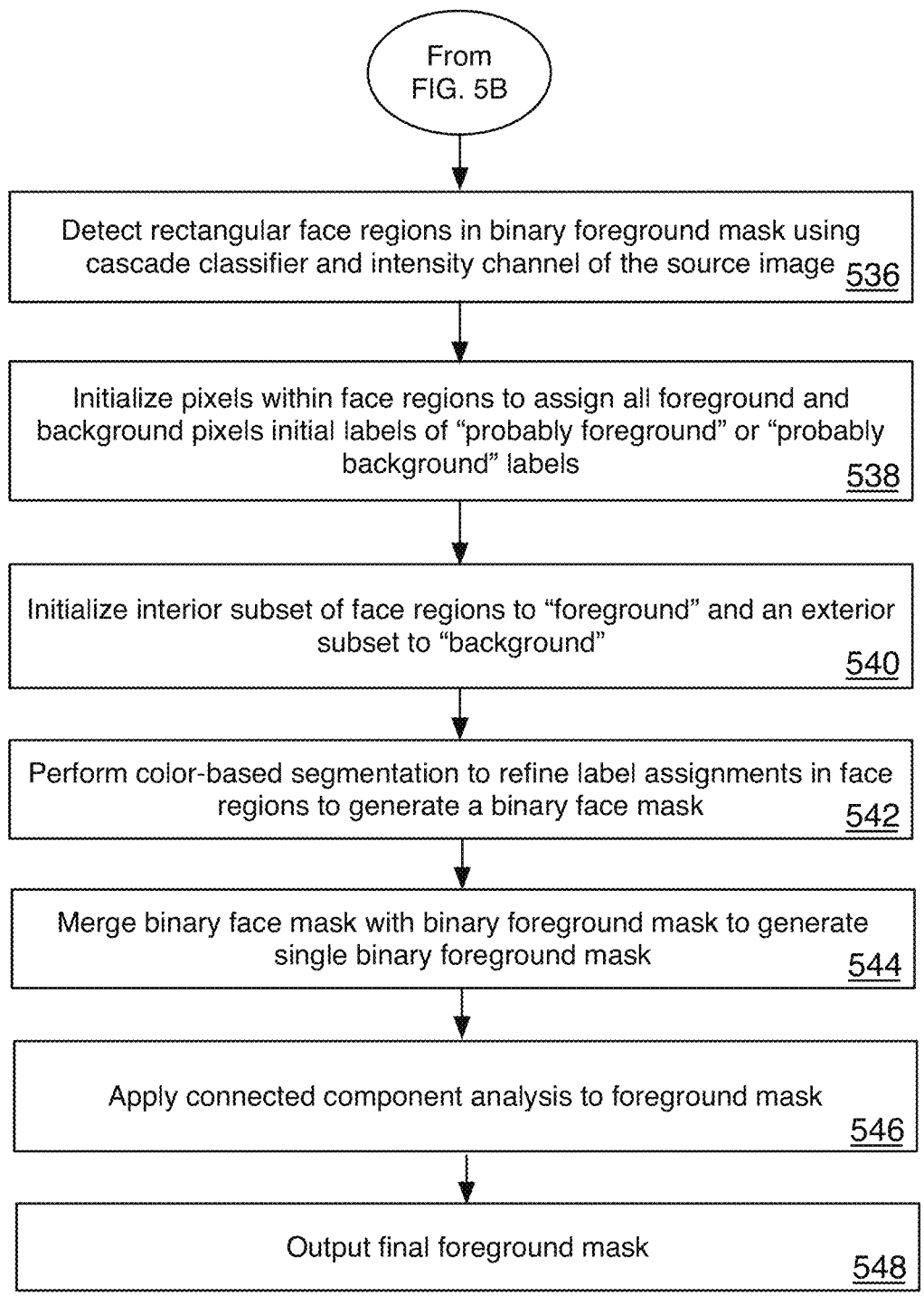

FIGS. 5A, 5B and 5C illustrate a flow diagram of an example image segmentation process 500 according to various implementations of the present disclosure. Process 500 may include one or more operations, functions or actions as illustrated by one or more of blocks 502-548 of FIGS. 5A, 5B and 5C and may result in the segmentation or extraction of a foreground portion of a source image to create a segmented source image. By way of non-limiting example, process 500 will be described herein with reference to example system 100 of FIG. 1, example source image 200 of FIG. 2, and example process 300 of FIG. 3. In various implementations, process 500 may be undertaken by vision engine 106 of system 100.

Process 500 may begin at block 502 where multiple target images (including background image portions) and associated homography matrices may be received. In various implementations, the source image contains portions from multiple target images. For each target image received at block 502 the corresponding homography matrix may be applied at block 504 to generate a projected target image and a binary projection matrix using known techniques (see, e.g., Vincent and Laganiere). Block 504 may involve using a homography matrix to project a target image onto the image plane of a source image so that the resulting projected target image is substantially aligned with the source image. In various implementations, block 504 may result in projected target images having similar geometric properties to that of a source image. For instance, a camera pose associated with a projected target image may be similar to the camera pose (associated with the source image) generated by process 300. In various implementations, target images and the source image may have the same resolution and aspect ratio. In implementations where target images and the source image may have different resolutions and/or aspect ratios, the projected target image has the same resolution and aspect ratio as the source image.

As noted above and illustrated in the example of FIG. 2, source image 200 includes a foreground portion 202 and a background portion 204. Although the target images of block 502 may have been captured in the same 3D environment 103 as a source image, the target images may have been taken from a different perspective (e.g., position and orientation) than the source image and may include at least some of background portion 204 without including the foreground portion 202 found in the source image. In various implementations, the target images received at block 502 may have been captured previously and stored in a database such as database 108 of system 100 along with their associated homography matrices.

At block 506, a source image (including foreground and background portions) may be received. The source image and the projected target images resulting from block 504 may be low pass filtered at block 508 to generate a filtered source image and filtered projected target images. At block 510, the intensity difference between the filtered source image and each of the filtered projected target images within the projection mask associated with each filtered projected target image may be determined to produce a corresponding difference map. Each of the difference maps may then be subjected to a threshold function to generate a coarsely segmented foreground mask within the projection mask (block 512). For example, a threshold function corresponding to 50% of maximum image intensity (e.g., a threshold value of 128 for 8-bit image intensities) may be applied at block 512. At block 514, the coarsely segmented foreground mask may be subtracted from the projection mask to generate an adjusted projection mask associated with each filtered projected target image.

While the filtered projected target images and filtered source image resulting from block 508 may be similar geometrically, substantial color differences may exist between them due to differences in camera properties, settings, light conditions and so forth. Hence, at block 516, color mappings may be estimated between each of the filtered projected target images and the filtered source image within each adjusted projection mask.

Referring now to FIG. 5B, process 500 may continue with the estimated color maps resulting from block 516 of FIG. 5A being applied to the corresponding filtered projected target images to generate color-adjusted projected target images at block 518. The color-adjusted projected target images resulting from block 518 may then have substantially similar color characteristics to the filtered source image resulting from block 508.

At block 520, intensity differences between each color-adjusted projected target image and the filtered source image may be determined to produce difference maps and the difference maps may be blended to generate a blended difference map. In a non-limiting example, the difference maps of block 520 may be determined as the absolute difference in intensity between the color-adjusted projected target images and the filtered source image. In such implementations, the blended difference map resulting from block 520 may correspond to a difference image. In various other implementations, different image similarity metrics such as cross-correlation, mutual information, sum of squared intensity differences, ratio image uniformity and so forth may be employed. Further, in various implementations, all color channels may be compared at block 520 to provide better discrimination between foreground and background colors.

At block 522, a low intensity threshold and a high intensity threshold (i.e., a dual thresholding function) may be applied to the blended difference map and the low-threshold result may be filtered by the high-threshold result to generate a binary foreground mask. In various implementations, the dual thresholding of block 522 may be undertaken using known techniques (see, e.g., W. Sun and S. P. Spackman, "Multi-object segmentation by stereo mismatch," Machine Vision and Applications, Vol. 7 Issue 2 (October 2009)).

Process 500 may continue at block 524 where the binary foreground mask resulting from block 522 may be refined by performing statistical analysis of the filtered source image and the corresponding color-adjusted projected target image in areas surrounding the binary foreground mask. The refinement of block 524 may be applied separately on each binary foreground mask within each projection mask.

In various implementations, the refinement undertaken at block 524 uses the intuition that foreground regions tend to be localized and well connected and pixels neighboring known foreground pixels are likely to be foreground pixels as well. Refinement at block 524 may, involve analyzing the statistics of local regions surrounding known foreground pixels in both foreground and target images. Background pixels in a local region may be added to the foreground mask when their statistics differ significantly between the foreground and target images. For example, the refinement procedure of block 524 may consider a local window (of say, 5×5 pixels) at each pixel that is labeled foreground. Pixels from each color channel in this window may be modeled using normal distributions with a mean ($\mu$) and standard deviation ($\sigma$). These parameters may be estimated from the foreground and target images using standard techniques such as maximum likelihood estimation. Two measures of dispersion may then be defined for each pixel in this local window under the assumption that the corresponding foreground and background pixels are both samples from these foreground and background distributions respectively. When the foreground and background statistics are similar, the measure of dispersion that is computed assuming either the foreground or background distribution are expected to be small and this condition may be expected to be true for pixels belonging to the background region. Both measures of dispersion are expected to be large for pixels belonging to the foreground region.

Hence, as a result of block 524, a pixel may be added to the foreground mask when both measures of dispersion, computed assuming the foreground and background distributions respectively, exceed a certain threshold. The measure of dispersion may be defined to be the maximum probability of the range of values between the foreground and background pixels across color channels. For instance, dispersion (assuming foreground distribution) based on sample pixels $[x_R, x_G, x_B]$ and $[y_R, y_G, y_B]$ from the foreground and background respectively, may, be defined as the maximum probability that the foreground distribution occupies the range of values between the foreground and background pixels across all the color channels: $m_X = \max_{i \in \{R,G,B\}} \text{abs}(\text{CDF}_{X_i}(x_i) - \text{CDF}_{X_i}(y_i))$. Here, $\text{CDF}_{X_i}$ denotes the cumulative distribution function of the foreground distribution in color channel i, respectively. A similar measure $m_Y$ may be defined assuming a background distribution. When both $m_X$ and $m_Y$ exceed a certain threshold, the pixel may be labeled as foreground. In various implementations, the values of $m_X$ and $m_Y$ may range between 0 and 1 and a corresponding threshold value may be about 0.5.

Refinement at block 524 may be repeated on newly added pixels to the foreground mask until either a maximum limit on the number of iterations is reached or until a minimum limit on number of pixels added per iteration is reached. Further, block 524 may also be performed in different color spaces. For instance, performing refinement in the YCbCr color space may be advantageous to minimize classification errors in the presence of significant lighting differences between the source and target images.

At block 526, the refined binary foreground masks resulting from block 524 may be merged to generate a binary foreground mask. For example, the different refined binary foreground masks obtained at block 524 from different planes may be combined using the logical OR operation at block 526. At block 528, floor portions may be subtracted from the filtered source image to generate a floor foreground mask. In various implementations, the floor subtraction may be performed in other color spaces such as YCbCr with subtraction being performed only in the Cb and Cr component spaces to improve robustness to lighting changes between the source and target images. At block 530, the floor foreground mask may be merged with the binary foreground mask from block 526 to generate a single binary foreground mask. The foreground mask resulting from block 530 may then be median filtered at block 532 to remove artifacts created by processing and merging the different planar structures.

Referring now to FIG. 5C, process 500 may continue at block 536 where rectangular facial regions may be detected in the binary foreground mask using a cascade classifier and the intensity channel of the source image. In various implementations, the parameters of the detection undertaken at block 536 may be tuned to minimize the false positive probability. At block 538, pixels within detected face regions may be initialized resulting in the assignment of all foreground and background pixels with the initial labels of either "probably foreground" or "probably background". At block 540, an interior subset of face regions may be initialized as "foreground" and an exterior subset as "background".

Process 500 may then continue at block 542 where color-based segmentation may be performed to refine the label assignments of face regions made at block 540 and to generate a binary face mask. In various implementations, block 542 may be undertaken using known techniques such as graph-cut techniques or the like to generate a face mask.

Process 500 may then continue at block 544 where the face mask from block 542 and the binary foreground mask from block 532 may be merged to produce a single binary foreground mask. In various implementations, the masks may be merged using the logical "OR" operation to ensure that the segmented image contains the face of any persons in the target image.

Figure 6:
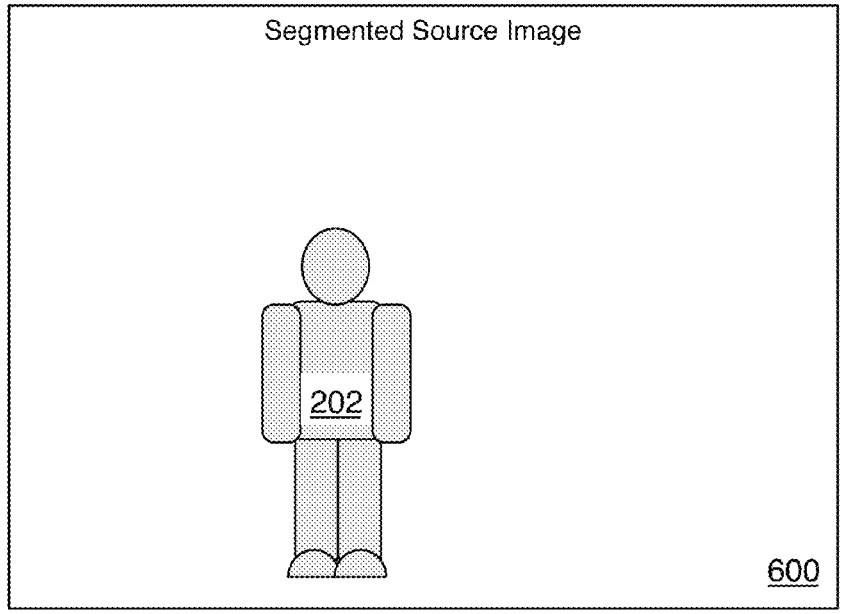
FIG. 6 illustrates an example segmented source image.

Process 500 may continue at block 546 where known techniques such as connected component analysis (see, e.g., Azriel Rosenfeld and John L. Pfaltz, "Sequential Operations in Digital Picture Processing," *J. ACM*, vol. 13, no. 4, pp. 471-494, October 1966) may be applied to the binary foreground mask from block 544 to obtain the components in the source image. In various implementations, block 546 may include filtering out and removing small components and/or filling in all the components to remove holes. Further, block 546 may also include removing components based on models of human anatomy and relative placement of different components with respect to the largest component (likely to be the torso) and so forth. Process 500 may then conclude at block 548 where the final binary foreground mask may be provided as the output of process 500. For example, FIG. 6 illustrates an example segmented source image 600 generated using the final foreground mask resulting from process 500. The segmented source image resulting from process 500 may be stored in a network accessible database such as database 108 of FIG. 1 and may be associated in that database with the camera pose resulting from process 300.

Figure 7:
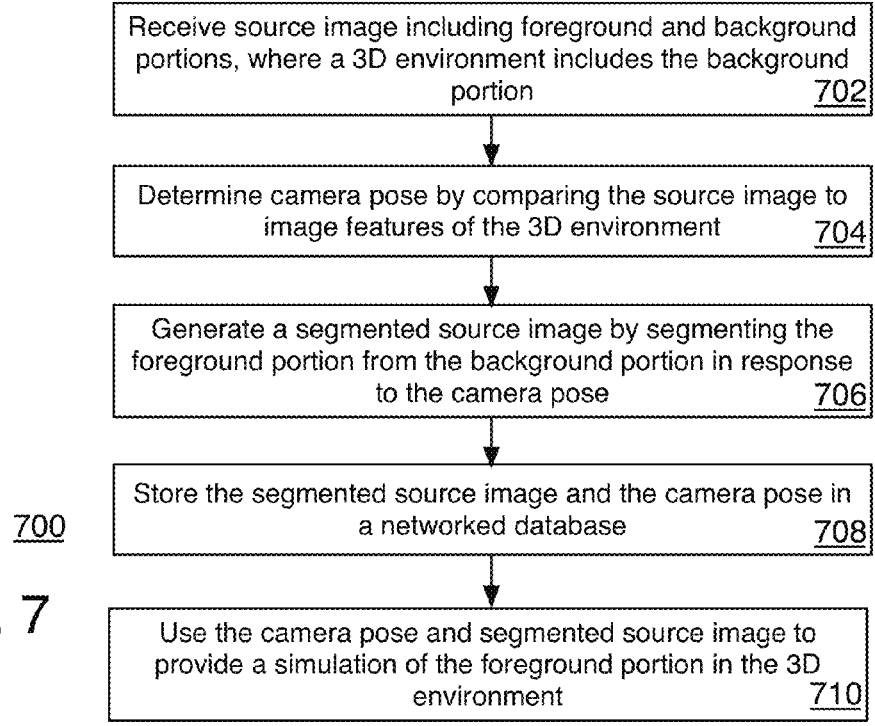
FIG. 7 is a flow chart illustrating an example 3D simulation process.

FIG. 7 illustrates a flow diagram of an example 3D simulation process 700 according to various implementations of the present disclosure. Process 700 may include one or more operations, functions or actions as illustrated by one or more of blocks 702, 704, 706, 708 and 710 of FIG. 7 and may result in a 3D simulation of an environment that incorporates a common background portion and foreground portions segmented from multiple 2D images using processes 300 and 500.

Process 700 may begin with the receipt of a source image including foreground and background portions (block 702) followed by the determination of a camera pose by comparing the source image to image features of the 3D environment (block 704). Blocks 702 and 704 may be undertaken in the manner described herein with regard to process 300. Process 700 may continue with the generation of a segmented source image by extraction of the foreground portion from the background portion using the camera pose (block 706) followed by storing of the segmented source image and the camera pose in a networked database (block 708). Blocks 706 and 708 may be undertaken in the manner described herein with regard to process 500.

Figure 8:
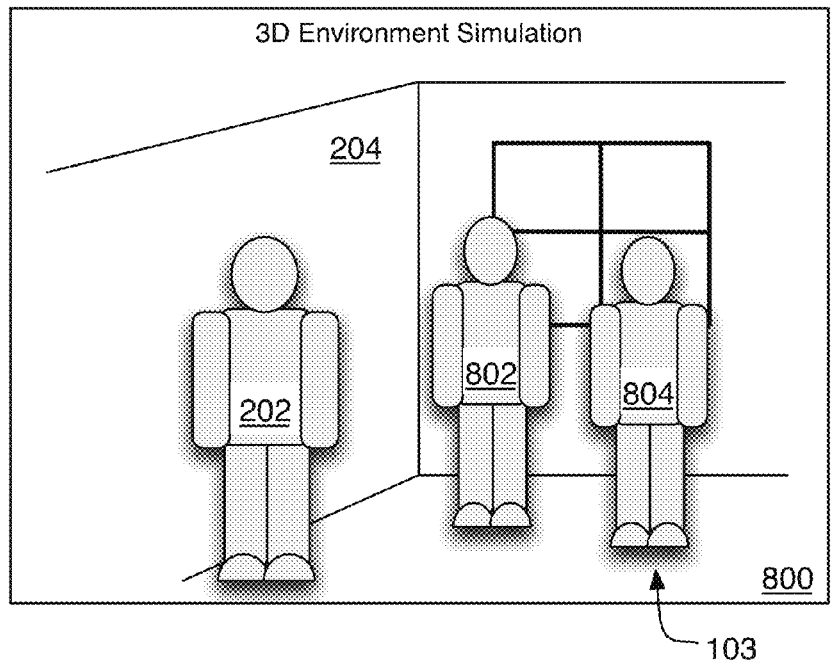
FIG. 8 illustrates an example 3D environment simulation.

Process 700 may conclude at block 710 with the use of the segmented source image and the associated camera pose to provide a simulation of the foreground portion in a virtual 3D environment. For example, display engine 110 of system 100 may retrieve segmented source images and associated camera pose metadata from database 108. Display engine 110 may then generate a 3D model or simulation of known 3D environment 103 including background 204. Foreground portions of the segmented source images may then be rendered in their respective locations in response to the respective camera pose metadata. As a result, a navigable 3D environment, such as a 3D photo browser, may be generated including foreground portions or elements, such as people and objects that have been collaboratively captured in real-time. For example, FIG. 8 illustrates an example 3D simulation 800 of environment 103 including foreground portion 202 of segmented source image 600 and also foreground portions 802 and 804 extracted from additional source images also subjected to the processes described herein.

While implementation of example processes 500 and 700, as illustrated in FIGS. 5 and 7, may include the undertaking of all blocks shown in the order illustrated, the present disclosure is not limited in this regard and, in various examples, implementation of processes 500 and 700 may include the undertaking only a subset of all blocks shown and/or in a different order than illustrated.

In addition, any one or more of the processes and/or blocks of FIGS. 3, 5 and 7 may be undertaken in response to instructions provided by one or more computer program products. Such program products may include signal bearing media providing instructions that, when executed by, for example, one or more processor cores, may provide the functionality described herein. The computer program products may be provided in any form of computer readable medium. Thus, for example, a processor including one or more processor core(s) may undertake one or more of the blocks shown in FIGS. 3, 5 and 7 in response to instructions conveyed to the processor by a computer readable medium.

Figure 9:
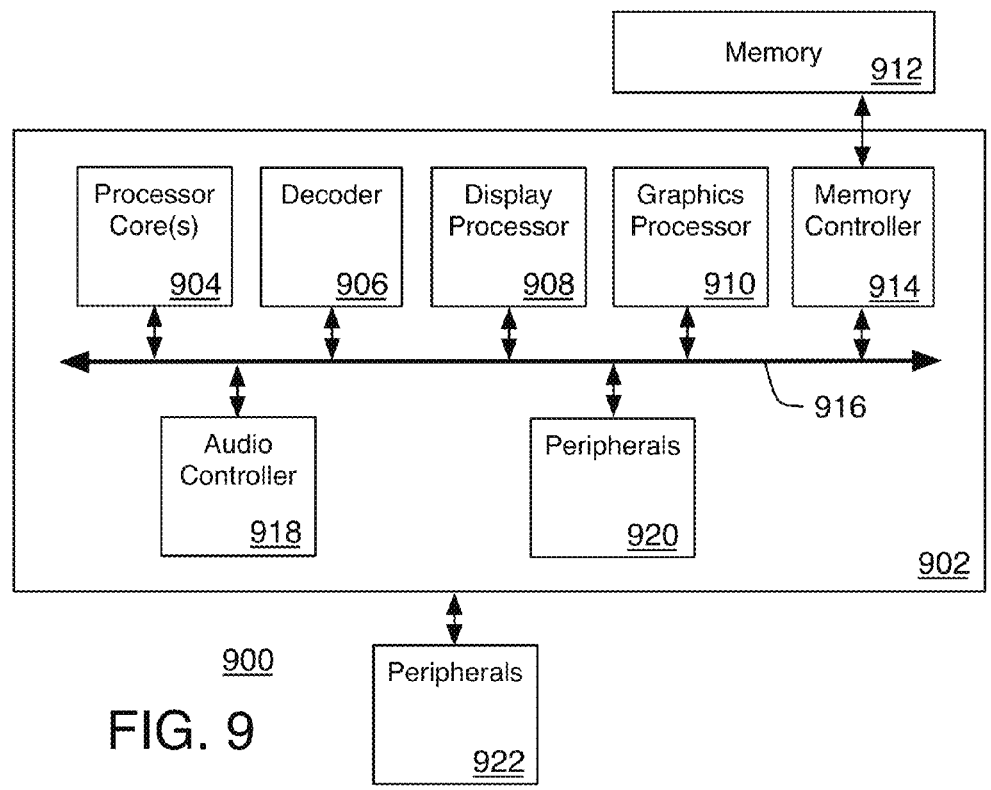
FIG. 9 is an illustrative diagram of an example system.

FIG. 9 illustrates an example system 900 in accordance with the present disclosure. System 900 may be used to perform some or all of the various functions discussed herein and may include any device or collection of devices capable of undertaking processes described herein in accordance with various implementations of the present disclosure. For example, system 900 may include selected components of a computing platform or device such as a desktop, mobile or tablet computer, a smart phone, a set top box, etc., although the present disclosure is not limited in this regard. In some implementations, system 900 may be a computing platform or SoC based on Intel® architecture (IA) for CE devices. It will be readily appreciated by one of skill in the art that the implementations described herein can be used with alternative processing systems without departure from the scope of the present disclosure.

System 900 includes a processor 902 having one or more processor cores 904. Processor cores 904 may be any type of processor logic capable at least in part of executing software and/or processing data signals. In various examples, processor cores 904 may include CISC processor cores, RISC microprocessor cores, VLIW microprocessor cores, and/or any number of processor cores implementing any combination of instruction sets, or any other processor devices, such as a digital signal processor or microcontroller.

Processor 902 also includes a decoder 906 that may be used for decoding instructions received by, a display processor 908 and/or a graphics processor 910, into control signals and/or microcode entry points. While illustrated in system 900 as components distinct from core(s) 904, those of skill in the art may recognize that one or more of core(s) 904 may implement decoder 906, display processor 908 and/or graphics processor 910. In some implementations, processor 902 may be configured to undertake any of the processes described herein including the example processes described with respect to FIGS. 3, 5A-5C and 7. Further, in response to control signals and/or microcode entry points, decoder 906, display processor 908 and/or graphics processor 910 may perform corresponding operations.

Processing core(s) 904, decoder 906, display processor 908 and/or graphics processor 910 may be communicatively and/or operably coupled through a system interconnect 916 with each other and/or with various other system devices, which may include but are not limited to, for example, a memory controller 914, an audio controller 918 and/or peripherals 920. Peripherals 920 may include, for example, a unified serial bus (USB) host port, a Peripheral Component Interconnect (PCI) Express port, a Serial Peripheral Interface (SPI) interface, an expansion bus, and/or other peripherals. While FIG. 9 illustrates memory controller 914 as being coupled to decoder 906 and the processors 908 and 910 by interconnect 916, in various implementations, memory controller 914 may be directly coupled to decoder 906, display processor 908 and/or graphics processor 910.

In some implementations, system 900 may communicate with various I/O devices not shown in FIG. 9 via an I/O bus (also not shown), Such I/O devices may include but are not limited to, for example, a universal asynchronous receiver/transmitter (UART) device, a USE device, an I/O expansion interface or other I/O devices. In various implementations, system 900 may represent at least portions of a system for undertaking mobile, network and/or wireless communications.

System 900 may further include memory 912, Memory 912 may be one or more discrete memory components such as a dynamic random access memory (DRAM) device, a static random access memory (SRAM) device, flash memory device, or other memory devices. While FIG. 9 illustrates memory 912 as being external to processor 902, in various implementations, memory 912 may be internal to processor 902. Memory 912 may store instructions and/or data represented by data signals that may be executed by processor 902 in undertaking any of the processes described herein including the example process described with respect to FIGS. 3, 5A-5C and 7. In some implementations, memory 912 may include a system memory portion and a display memory portion.

Figure 10:
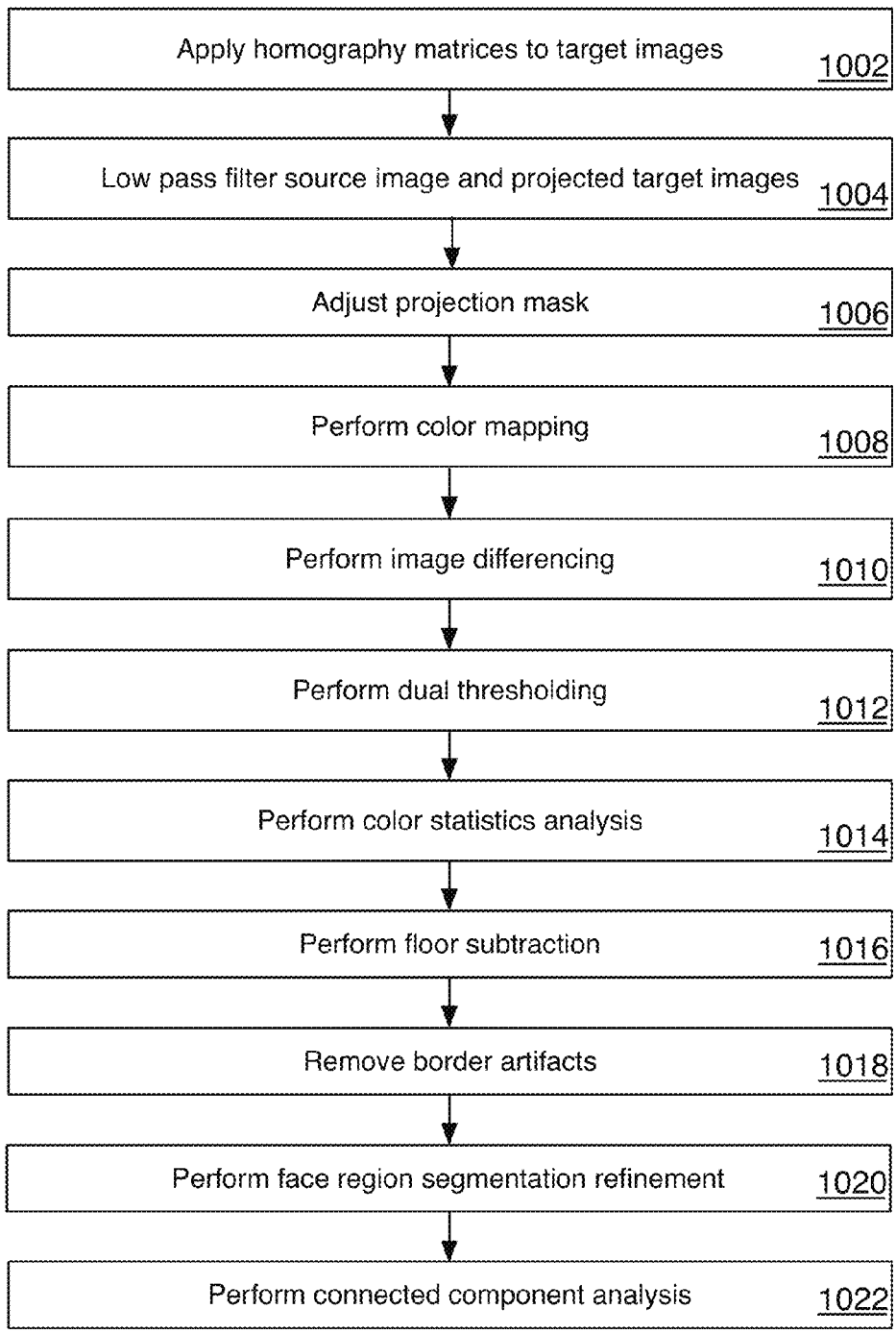
FIG. 10 illustrates an example image segmentation process, all arranged in accordance with at least some implementations of the present disclosure.

FIG. 10 illustrates a flow diagram of an example image segmentation process 1000 according to various implementations of the present disclosure. Process 1000 may include one or more operations, functions or actions as illustrated by one or more of blocks 1002-1022 of FIG. 10. The various blocks of process 1000 will be described herein in reference to process 500 of FIGS. 5A, 5B and 5C.

Process 1000 may begin at block 1002 where homography matrices may be applied to target images as described above with reference to blocks 502 and 504 of process 500. At block 1004, low pass filtering of a source image and projected target images may be performed as described above with reference to blocks 506 and 508 of process 500. At block 1006, a projection mask may be adjusted as described above with reference to blocks 510, 512 and 514 of process 500. At block 1008, color mapping may be performed as described above with reference to blocks 516 and 518 of process 500. At block 1010, image differencing may be performed as described above with reference to block 520 of process 500.

Process 1000 may continue at block 1012 where dual thresholding may be performed as described above with reference to block 522 of process 500, followed by the performance of color statistics analysis (block 1014) as described above with reference to blocks 524 and 526 of process 500. At block 1016, floor subtraction may be performed as described above with reference to blocks 528 and 530 of process 500. At block 1018, border artifacts may be removed as described above with reference to block 532 of process 500.

Process 1000 may continue at block 1020 where face region segmentation refinement may be performed as described above with reference to blocks 536, 538, 540, 542 and 544 of process 500. Process 1000 may conclude at block 1022 where connected component analysis may be performed as described above with reference to block 546 of process 500.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A method for segmenting images, comprising:
   receiving a source image, the source image including a foreground portion and a background portion, wherein the background portion includes image content of a three-dimensional (3D) environment;
   determining a camera pose of the source image by comparing the source image to a plurality of target images of the 3D environment;
   generating a segmented source image by segmenting the foreground portion from the background portion in response to the camera pose; and
   storing the segmented source image and the camera pose in a networked database;
   wherein segmenting the foreground portion comprises:
      for each target image, applying a homography matrix to the target image to generate a projection mask and a projected target image, the projection mask indicating at least some of the background portion of the target image within the source image;
      color adjusting each projected target image to the source image;
      generating a plurality of intensity difference maps by comparing the color-adjusted projected target images to the source image; and
      merging the intensity difference maps to generate a blended difference map.

2. The method of claim 1, wherein determining the camera pose comprises:
   extracting at least one source image visual feature from the source image;
   determining a best matched target image by comparing the at least one source image visual feature to the plurality of target images; and
   projecting the source image onto a planar structure in the 3D environment associated with the best-matched target image, the planar structure having 3D coordinates in the 3D environment.

3. The method of claim 1, further comprising:
   applying dual-thresholding to the blended difference map to generate a plurality of first binary foreground masks; and
   refining each first binary foreground mask by performing statistical analysis of the source image and the color-adjusted projected target image.

4. The method of claim 1, further comprising:
   subtracting floor portions from the filtered source image to produce a floor mask;
   blending the plurality of first refined foreground masks and the floor mask to produce a second binary foreground mask; and
   applying a median filter to the second binary foreground mask.

5. The method of claim 4, further comprising:
   detecting face regions in the second binary foreground mask to generate a face mask;
   blending the face mask with the second binary foreground mask to generate a third binary foreground mask; and
   applying connected component analysis to the third binary foreground mask.

6. The method of claim 1, wherein color adjusting each projected target image to the source image comprises:
   generating a difference map by comparing each projected target image to the source image; applying a fixed threshold to the difference map to generate a coarsely segmented foreground mask;
   subtracting the coarsely segmented foreground mask from the projection mask to generate the adjusted projection mask;
   estimating a color mapping, within the adjusted projection mask, from the projected target image to the source image; and
   applying the color mapping, within the original projection mask, to the projected target image to generate the color-adjusted projected target image.

7. The method of claim 1, further comprising:
   using the camera pose and segmented source image to provide a simulation of the foreground portion in the 3D environment.

8. A system, comprising:
   a processor and a memory coupled to the processor, wherein instructions in the memory configure the processor to:
   receive a source image, the source image including a foreground portion and a background portion, wherein the background portion includes image content of a three-dimensional (3D) environment;
   determine a camera pose of the source image by comparing the source image to a plurality of target images of the 3D environment;
   generate a segmented source image by segmenting the foreground portion from the background portion in response to the camera pose;
   store the segmented source image and the camera pose in a networked database;
   wherein instructions that configure the processor to segment the foreground portion include instructions that configure the processor to:
      for each target image, apply a homography matrix to the target image to generate a projection mask and a projected target image, the projection mask indicating at least some of the
      background portion of the target image within the source image;
      color adjust each projected target image to the source image;
      generate a plurality of intensity difference maps by comparing the color-adjusted projected target images to the source image; and
      merge the intensity difference maps to generate a blended difference map.

9. The system of claim 8, wherein instructions that configure the processor to determine the camera pose include instructions that configure the processor to:
   extract at least one source image visual feature from the source image;
   determine a best matched target image by comparing the at least one source image visual feature to the plurality of target images; and
   project the source image onto a planar structure in the 3D environment associated with the best-matched target image, the planar structure having 3D coordinates in the 3D environment.

10. The system of claim 8, further comprising instructions that configure the processor to:

apply dual-thresholding to the blended difference map to generate a plurality of first binary foreground masks; and refine each first binary foreground mask by performing statistical analysis of the source image and the color-adjusted projected target image.

11. The system of claim 10, further comprising instructions that configure the processor to:

subtract floor portions from the filtered source image to produce a floor mask;

blend the plurality of first refined foreground masks and the floor mask to produce a second binary foreground mask; and apply a median filter to the second binary foreground mask.

12. The system of claim 11, further comprising instructions that configure the processor to:

detect face regions in the second binary foreground mask to generate a face mask;

blend the face mask with the second binary foreground mask to generate a third binary foreground mask; and apply connected component analysis to the third binary foreground mask.

13. The system of claim 8, wherein instructions that configure the processor to color adjust each projected target image to the source image include instructions that configure the processor to:

generate a difference map by comparing each projected target image to the source image;

apply a fixed threshold to the difference map to generate a coarsely segmented foreground mask;

subtract the coarsely segmented foreground mask from the projection mask to generate the adjusted projection mask;

estimate a color mapping, within the adjusted projection mask, from the projected target image to the source image; and apply the color mapping, within the original projection mask, to the projected target image to generate the color-adjusted projected target image.

14. The system of claim 8, further comprising instructions that configure the processor to:

use the camera pose and segmented source image to provide a simulation of the foreground portion in the 3D environment.

15. An article comprising a non-transitory computer program product having stored therein instructions that, if executed, result in:

receiving a source image, the source image including a foreground portion and a background portion, wherein the background portion includes image content of a three dimensional (3D) environment;

determining a camera pose of the source image by comparing the source image to a plurality of target images of the 3D environment;

generating a segmented source image by segmenting the foreground portion from the background portion in response to the camera pose;

storing the segmented source image and the camera pose in a networked database;

wherein the instructions that result in segmenting the foreground portion include instructions that, if executed, result in:

for each target image, applying a homography matrix to the target image to generate a projection mask and a projected target image, the projection mask indicating at least some of the background portion of the target image within the source image;

color adjusting each projected target image to the source image;

generating a plurality of intensity difference maps by comparing the color-adjusted projected target images to the source image; and merging the intensity difference maps to generate a blended difference map.

16. The article of claim 15, wherein the instructions that result in determining the camera pose include instructions that, if executed, result in:

extracting at least one source image visual feature from the source image;

determining a best matched target image by comparing the at least one source image visual feature to the plurality of target images; and projecting the source image onto a planar structure in the 3D environment associated with the best-matched target image, the planar structure having 3D coordinates in the 3D environment.

17. The article of claim 16, further comprising instructions that, if executed, result in:

applying dual-thresholding to the blended difference map to generate a plurality of first binary foreground masks; and refining each first binary foreground mask by performing statistical analysis of the source image and the color-adjusted projected target image.

18. The article of claim 17, further comprising instructions that, if executed, result in:

subtracting floor portions from the filtered source image to produce a floor mask;

blending the plurality of first refined foreground masks and the floor mask to produce a second binary foreground mask; and applying a median filter to the second binary foreground mask.

19. The article of claim 18, further comprising instructions that, if executed, result in:

detecting face regions in the second binary foreground mask to generate a face mask;

blending the face mask with the second binary foreground mask to generate a third binary foreground mask; and applying connected component analysis to the third binary foreground mask.

20. The article of claim 16, wherein the instructions that result in color adjusting each projected target image to the source image include instructions that, if executed, result in:

generating a difference map by comparing each projected target image to the source image; applying a fixed threshold to the difference map to generate a coarsely segmented foreground mask;

subtracting the coarsely segmented foreground mask from the projection mask to generate the adjusted projection mask;

estimating a color mapping, within the adjusted projection mask, from the projected target image to the source image; and applying the color mapping, within the original projection mask, to the projected target image to generate the color-adjusted projected target image.

21. The article of claim 15, further comprising instructions that, if executed, result in:

using the camera pose and segmented source image to provide a simulation of the foreground portion in the 3D environment.

* * * * *